(12) United States Patent
Harada

(10) Patent No.: US 9,585,098 B2
(45) Date of Patent: Feb. 28, 2017

(54) INTRA-BODY COMMUNICATION SYSTEM WITH CHARGE CONTROL, COMMUNICATION DEVICE, AND PROGRAM

(71) Applicant: KONICA MINOLTA, INC., Chiyoda-ku (JP)

(72) Inventor: Kazuki Harada, Kobe (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/541,368

(22) Filed: Nov. 14, 2014

(65) Prior Publication Data

US 2015/0147963 A1    May 28, 2015

(30) Foreign Application Priority Data

Nov. 22, 2013  (JP) ................................ 2013-241773

(51) Int. Cl.
  *H04W 52/02*  (2009.01)
  *H04B 13/00*  (2006.01)
  (Continued)

(52) U.S. Cl.
  CPC ........ *H04W 52/0245* (2013.01); *G06F 3/044* (2013.01); *H04B 5/0012* (2013.01);
  (Continued)

(58) Field of Classification Search
  None
  See application file for complete search history.

(56) References Cited

U.S. PATENT DOCUMENTS

2005/0244166 A1* 11/2005 Shinagawa ............. G06F 1/163
                                                    398/186
2006/0281406 A1* 12/2006 Ishibashi .............. H04B 13/005
                                                    455/41.1
(Continued)

FOREIGN PATENT DOCUMENTS

JP         2006-350990 A      12/2006
JP         2009-253478 A      10/2009
(Continued)

OTHER PUBLICATIONS

Office Action (Notice of Reasons for Rejection) issued on Aug. 4, 2015, by the Japanese Patent Office in corresponding Japanese Patent Application No. 2013-241773, and an English Translation of the Office Action. (7 pages).

*Primary Examiner* — Alejandro Rivero
(74) *Attorney, Agent, or Firm* — Buchanan Ingersoll & Rooney PC

(57) ABSTRACT

A communication system includes: a first communication device carried by a user and including a first intra-body communication unit configured to carry out data communication with the second communication device via the user's body, and a charge control unit configured to control a charge amount on the body surface; and a second communication device including a capacitive touch panel, an intra-body communication antenna, a second intra-body communication unit configured to carry out data communication with the first communication device via the body, and an intra-body communication control unit configured to perform control to increase signal strength of a signal received at the second intra-body communication unit when a measured value of the signal strength is lower than a predetermined threshold under a condition that user's touch operation on the touch panel is started.

16 Claims, 11 Drawing Sheets

(51) Int. Cl.
*H04B 5/00* (2006.01)
*H04N 1/00* (2006.01)
*G06F 3/044* (2006.01)

(52) U.S. Cl.
CPC ......... *H04B 5/0031* (2013.01); *H04B 13/005* (2013.01); *H04N 1/00204* (2013.01); *H04N 1/00411* (2013.01); *H04N 2201/006* (2013.01); *H04N 2201/0094* (2013.01); *Y02B 60/50* (2013.01)

(56) References Cited

U.S. PATENT DOCUMENTS

| | | | | |
|---|---|---|---|---|
| 2008/0123599 | A1* | 5/2008 | Ishibashi | H04B 13/005 370/335 |
| 2009/0251339 | A1 | 10/2009 | Naruse | |
| 2009/0298447 | A1* | 12/2009 | Kim | H04B 13/005 455/127.1 |
| 2012/0026129 | A1* | 2/2012 | Kawakami | G06F 1/1643 345/174 |

FOREIGN PATENT DOCUMENTS

| | | |
|---|---|---|
| JP | 2011-259171 A | 12/2011 |
| JP | 2012-034157 A | 2/2012 |
| JP | 2012-034158 A | 2/2012 |
| JP | 2013-046337 A | 3/2013 |

\* cited by examiner

INTRA-BODY COMMUNICATION SYSTEM WITH CHARGE CONTROL, COMMUNICATION DEVICE, AND PROGRAM

The entire disclosure of Japanese Patent Application No. 2013-241773 filed on Nov. 22, 2013 including description, claims, drawings, and abstract are incorporated herein by reference in its entirety.

BACKGROUND OF THE INVENTION

Field of the Invention

The present invention relates to a communication system and technologies relating thereto.

Description of the Related Art

There are technologies (intra-body communication technologies) for communication using an electrostatic field at the surface of a user's body (refer to JP 2013-46337 A).

With such an intra-body communication technology, data communication is carried out by using the charge stored in the human body, and is thus susceptible to noise. For example, JP 2013-46337 A discloses a technology to improve the SNR (signal-to-noise ratio) to stabilize communication by increasing an area of contact with a human body when the SNR has become lower than a threshold.

It may be, however, difficult to increase the contact area as disclosed in JP 2013-46337 A depending on the situation.

Alternatively, the communication strength (signal strength level) may be increased by using other methods to stabilize communication. If communication strength is always controlled to be increased, however, there is a problem of increased power consumption. In particular, a communication unit at a human body is driven by a battery, and the period for which the communication unit can be driven by the battery (and also the period during which communication can be carried out) is shorter as the power consumption is larger.

SUMMARY OF THE INVENTION

In view of the above, an object of the present invention is to provide an intra-body communication technology capable of reducing power consumption and stabilizing communication.

To achieve at least one of the above-mentioned objects, according to an aspect, a communication system reflecting one aspect of the present invention comprises: a first communication device carried by a user; and a second communication device that carries out data communication with the first communication device via the user's body, wherein the first communication device comprises: a first intra-body communication unit configured to carry out data communication with the second communication device via the body, and a charge control unit configured to control an amount of charge on a surface of the body, the second communication device comprises: a capacitive touch panel, an intra-body communication antenna placed to be close to the body, a second intra-body communication unit configured to carry out data communication with the first communication device via the body by using an electrostatic field at a first position where the first communication device and the body are close to each other and an electrostatic field at a second position where the body and the intra-body communication antenna are close to each other, and an intra-body communication control unit configured to perform signal strength increasing control to increase signal strength of a signal received at the second intra-body communication unit when a measured value of the signal strength is lower than a predetermined threshold under a condition that user's touch operation on the touch panel is started, and the signal strength increasing control is control for increasing voltage for controlling a charge amount of the charge control unit of the first communication device according to a difference between the predetermined threshold and the measured value to increase the signal strength of the received signal at the second intra-body communication unit.

According to Item. 2, in the communication system of Item. 1, the intra-body communication control unit preferably transmits an increase instruction to increase voltage for controlling the charge amount of the charge control unit to the first intra-body communication unit to increase the voltage for controlling the charge amount of the charge control unit.

According to Item. 3, in the communication system of Item. 1 or Item. 2, when the user's touch operation on the touch panel is terminated, the intra-body communication control unit preferably performs no signal strength increasing control.

According to Item. 4, in the communication system of any of Item. 1 to Item. 3, the intra-body communication antenna is preferably provided at a floor mat connected to a body of the second communication device.

According to Item. 5, in the communication system of any of Item. 1 to Item. 3, the second communication device is preferably a personal digital assistant, and the intra-body communication antenna is preferably provided on a face of the personal digital assistant other than a face on which the touch panel is placed.

According to Item. 6, in the communication system of any of Item. 1 to Item. 3, the intra-body communication antenna is preferably built in the touch panel.

According to Item. 7, in the communication system of any of Item. 1 to Item. 6, the first intra-body communication unit is preferably driven by a battery in the first communication device.

To achieve at least one of the above-mentioned objects, according to an aspect, a communication device reflecting one aspect of the present invention capable of carrying out intra-body communication with a communication unit, comprises: a capacitive touch panel; an intra-body communication antenna placed to be close to a user's body; an intra-body communication unit configured to carry out data communication with the communication unit via the body by using an electrostatic field at a first position where the communication unit and the body are close to each other and an electrostatic field at a second position where the body and the intra-body communication antenna are close to each other; and an intra-body communication control unit configured to perform signal strength increasing control to increase signal strength of a signal received at the intra-body communication unit when a measured value of the signal strength is lower than a predetermined threshold under a condition that user's touch operation on the touch panel is started, wherein the signal strength increasing control is control for increasing voltage for controlling a charge amount of a charge control unit of the communication unit according to a difference between the predetermined threshold and the measured value to increase the signal strength.

According to Item. 9, in the communication device of Item. 8, the intra-body communication control unit preferably transmits an increase instruction to increase voltage for controlling the charge amount of the charge control unit of the communication unit to the communication unit to increase the voltage for controlling the charge amount.

According to Item. 10, in the communication device of Item. 8 or Item. 9, when the user's touch operation on the touch panel is terminated, the intra-body communication control unit preferably performs no signal strength increasing control.

According to Item. 11, in the communication device of any of Item. 8 to Item. 10, the communication device is preferably an image forming apparatus.

To achieve at least one of the above-mentioned objects, according to an aspect, a non-transitory recording medium storing a computer readable program causes a computer built in a communication device capable of carrying out intra-body communication with a communication unit carried by a user to execute the processing comprising the steps of: a) carrying out data communication with the communication unit via a user's body by using an electrostatic field at a contact position between the body and an intra-body communication antenna placed to be close to the body; and b) performing signal strength increasing control to increase signal strength of a signal received by the intra-body communication antenna when a measured value of the signal strength is smaller than a predetermined threshold under a condition that user's touch operation on a capacitive touch panel provided on the communication device is started, wherein the signal strength increasing control is control for increasing voltage for controlling a charge amount of a charge control unit of the communication unit according to a difference between the predetermined threshold and the measured value to increase the signal strength.

To achieve at least one of the above-mentioned objects, according to an aspect, a communication system reflecting one aspect of the present invention comprises: a first communication device carried by a user; and a second communication device that carries out data communication with the first communication device via the user's body, wherein the second communication device comprises: a capacitive touch panel, an intra-body communication antenna placed to be close to the body, and a charge control unit configured to control an amount of charge on a surface of the body, the first communication device comprises: a first intra-body communication unit configured to carry out data communication with the second communication device via the body by using an electrostatic field at a first position where the second communication device and the body are close to each other and an electrostatic field at a second position where the intra-body communication antenna and the body are close to each other, an acquisition unit configured to acquire information on user's touch operation on the touch panel, and an intra-body communication control unit configured to perform signal strength increasing control to increase signal strength of a received signal at the first intra-body communication unit when a measured value of the signal strength is lower than a predetermined threshold under a condition that user's touch operation on the touch panel is started, and the signal strength increasing control is control for increasing voltage for controlling a charge amount of the charge control unit according to a difference between the predetermined threshold and the measured value to increase the signal strength.

According to Item. 14, in the communication system of Item. 13, the intra-body communication control unit of the second communication device preferably transmits an increase instruction to increase voltage for controlling the charge amount of the charge control unit to the second intra-body communication unit provided in the second communication device to increase the voltage for controlling the charge amount of the charge control unit.

To achieve at least one of the above-mentioned objects, according to an aspect, a communication device carried by a user and reflecting one aspect of the present invention comprises: a first intra-body communication unit configured to carry out data communication with a communication counterpart device via the user's body by using an electrostatic field at a first position where the communication counterpart device and the user's body are close to each other and an electrostatic field at a second position where the body and an intra-body communication antenna provided at the communication counterpart device are close to each other; an acquisition unit configured to acquire information on user's touch operation on a capacitive touch panel provided on the communication counterpart device, and an intra-body communication control unit configured to perform signal strength increasing control to increase signal strength of a received signal at the first intra-body communication unit when a measured value of the signal strength is lower than a predetermined threshold under a condition that user's touch operation on the touch panel is started, wherein the signal strength increasing control is control for increasing voltage for controlling a charge amount of a charge control unit provided in the communication counterpart device according to a difference between the predetermined threshold and the measured value to increase the signal strength.

To achieve at least one of the above-mentioned objects, according to an aspect, a non-transitory recording medium storing a computer readable program causes a computer served as a communication device carried by a user to execute the processing comprising the steps of: a) carrying out data communication with a communication counterpart device via the user's body by using an electrostatic field at a first position where the communication counterpart device and the body are close to each other and an electrostatic field at a second position where the body and an intra-body communication antenna provided at the communication counterpart device are close to each other; b) acquiring information on user's touch operation on a capacitive touch panel provided on the communication counterpart device, and c) performing signal strength increasing control to increase signal strength of a signal received by the communication device when a measured value of the signal strength is smaller than a predetermined threshold under a condition that user's touch operation on the touch panel is started, wherein the signal strength increasing control is control for increasing voltage for controlling a charge amount of a charge control unit provided in the communication counterpart device according to a difference between the predetermined threshold and the measured value to increase the signal strength.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

1. First Embodiment

Overall Configuration

Figure 1:
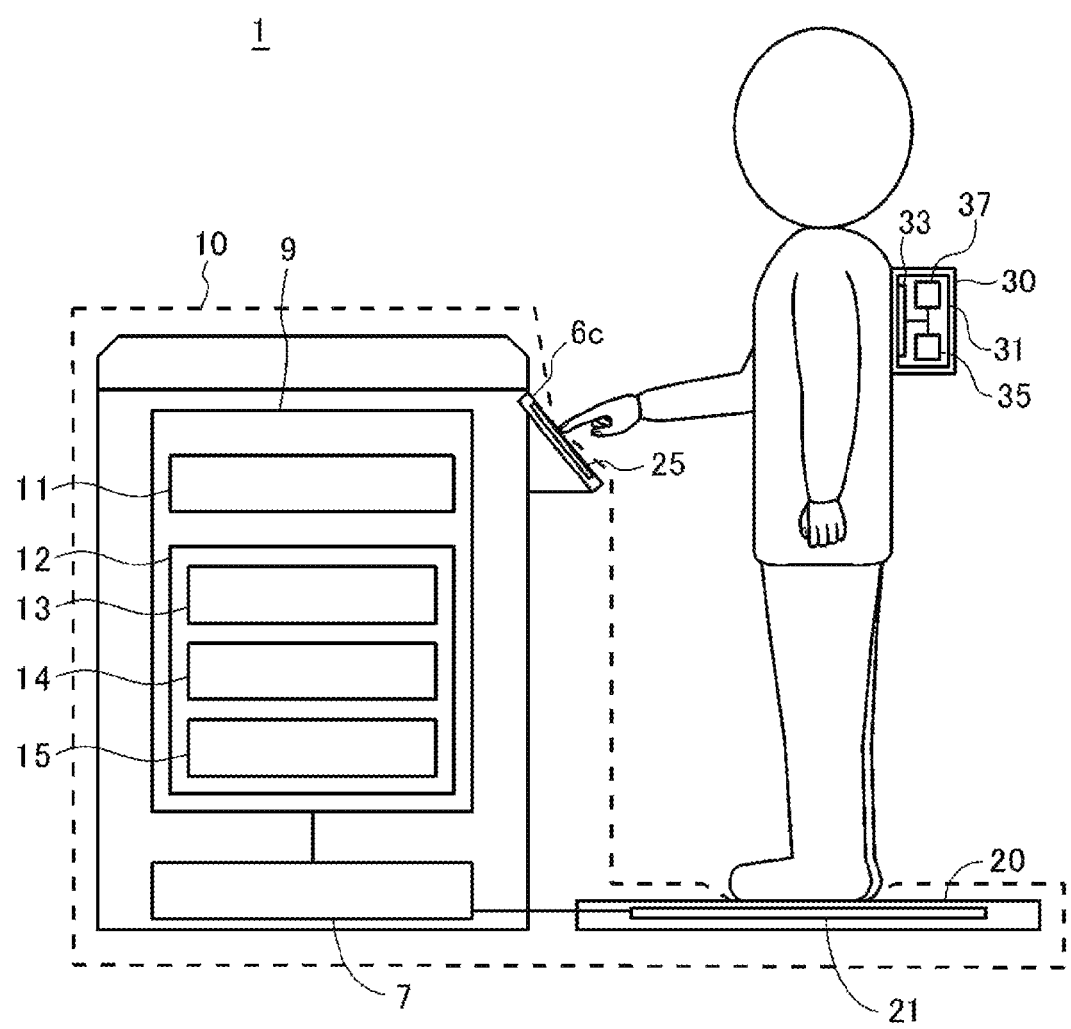
FIG. 1 is a schematic diagram showing a communication system according to a first embodiment.

FIG. 1 is a schematic diagram showing a communication system 1 according to a first embodiment.

As shown in FIG. 1, the communication system 1 includes one communication device 10, and another communication device 30 that is carried by a user. Herein, an example in which a multi-functional peripheral (MFP) is used as the communication device 10 will be described. The communication device 30 is a communication terminal device carried by a user, and is thus also referred to as a portable terminal.

In the communication system (data communication system) 1, communication (data communication) is carried out between the MFP (communication device) 10 and the portable terminal (communication device 30) via the body of the user and an antenna 21 for intra-body communication, which will be described later, of the MFP 10, and the like. Since the communication is carried out by using a charge (and also a capacitance) on the surface of human body or the like, the communication is also expressed as intra-body communication.

The portable terminal 30 includes a communication unit 31 (at the human body). The communication unit 31 is provided at the portable terminal 30 carried by the user, and carries out data communication between the MFP 10 and an intra-body communication unit 37. The communication unit 31 is a communication unit including an electrode 33 for intra-body communication, a charge control unit 35, an intra-body communication unit 37, etc. The electrode 33 is provided on the surface (or near the surface) of the portable terminal 30. The charge control unit 35 can control the charge amount on the body surface near the electrode 33. Specifically, the charge control unit 35 controls the charge amount on the body by changing the potential of the electrode 33 so that voltage for controlling the charge amount is adjusted.

Furthermore, the portable terminal 30 (including the communication unit 31) is electrically driven by a battery (secondary battery, or the like) in the portable terminal 30.

The MFP 10 includes a body part and a floor mat 20 electrically connected to the body part. The floor mat 20 includes an antenna (electrode) 21 for intra-body communication. The intra-body communication antenna 21 is used for intra-body communication with the portable terminal 30, and provided at the MFP 10. Herein, an example in which the intra-body communication antenna 21 under the floor mat is used as the intra-body communication antenna will be described. The intra-body communication antenna 21 is positioned to be near the user's body (sole) when the user stands on the floor mat 20.

<Configuration>

Figure 2:
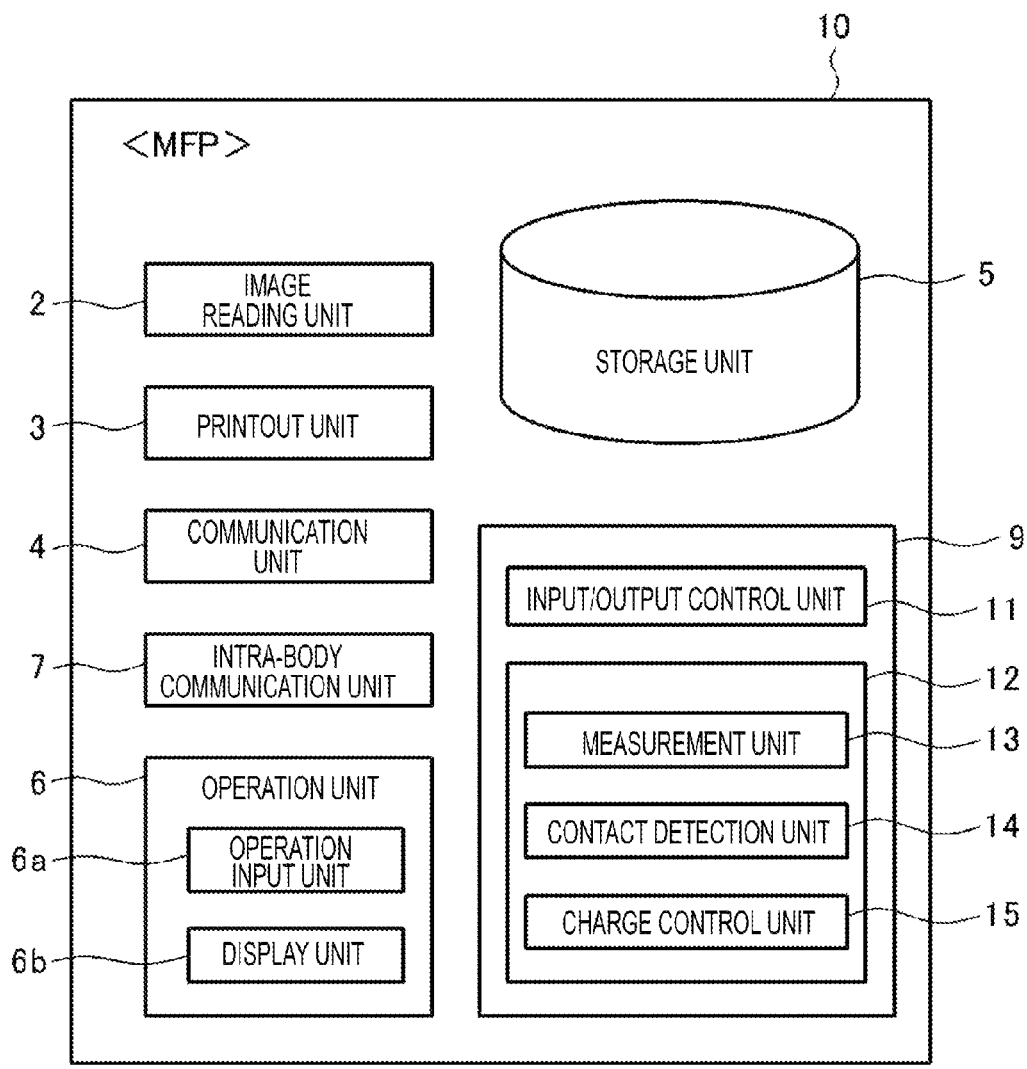
FIG. 2 is a diagram showing functional blocks of a MFP.

FIG. 2 is a diagram showing functional blocks of the MFP 10.

The MFP 10 is an apparatus (also referred to as a multifunction machine) including a scanning function, a copy function, a facsimile function, a box storage function, and the like. Specifically, the MFP 10 includes an image reading unit 2, a printout unit 3, a communication unit 4, a storage unit 5, an operation unit 6, a controller 9, and the like as shown in the functional block diagram of FIG. 2, and realizes various function by operating the respective units in combination. Note that the MFP 10 is also referred to as an image processing apparatus or an image forming apparatus.

The image reading unit 2 is a processor configured to optically read (that is, scan) an original document placed at a predetermined position on the MFP 10 and generate image data of the original document (also referred to as an original document image or a scanned image). The image reading unit 2 is also referred to as a scanning unit.

The printout unit 3 is an output unit configured to print out an image on various media such as paper on the basis of data on an original to be printed.

The communication unit 4 can carry out facsimile communication via a public line or the like. Furthermore, the communication unit 4 can also carry out network communication via a network NW. In the network communication, various protocols such as TCP/IP (Transmission Control Protocol/Internet Protocol) are used. The MFP 10 can transmit and receive various data to/from desired counterpart devices by using the network communication.

The storage unit 5 is a storage device such as a hard disk drive (HDD).

The operation unit 6 includes an operation input unit 6a configured to receive an operational input to the MFP 10 and a display unit 6b configured to output display of various information. The MFP 10 is provided with a capacitive operation panel (also referred to as a touch panel or a touch screen) 25 (see FIG. 1). The capacitive touch panel 25 can detect whether or not a finger of an operator is in contact with the surface of the touch panel 25 on the basis of a change in capacitance when the finger touches the surface. The capacitive touch panel 25 may also be expressed as a touch panel using an electrostatic field. Such a touch panel 25 also functions as part of the operation input unit 6a and as part of the display unit 6b.

The intra-body communication unit 7 is a communication unit capable of performing data communication operation (intra-body communication operation) with the communication unit 31 (intra-body communication unit 37) of the portable terminal 30 via the user's body. The intra-body communication operation with the intra-body communication unit 7 is controlled by an intra-body communication control unit 12, which will be described later.

The controller 9 is a control device included in the MFP 10 and configured to generally control the MFP 10. The controller 9 is a computer system including a CPU, various semiconductor memories (a RAM and a ROM), and the like. The controller 9 realizes various processors by executing predetermined software programs (hereinafter may simply referred to as programs) stored in the ROM (EEPROM, for example). Note that the programs (specifically, a group of program modules) may be recorded in a portable recording medium such as a USB memory and installed in the MFP 10 via the recording medium. Alternatively, the programs may be downloaded via the network NW or the like and installed in the MFP 10.

Specifically, as shown in FIG. 2, the controller 9 realizes various processors including an input/output control unit 11 and the intra-body communication control unit 12 by executing the programs.

The input/output control unit 11 is a processor configured to display an operation screen on the touch panel 25 of the MFP 10 and receive an operational input to the operation screen (specifically, an operational input entered by a finger of the operator).

The intra-body communication control unit 12 is a processor configured to control intra-body communication operation with a counterpart device (portable terminal 30).

The intra-body communication control unit 12 includes a measurement unit 13, a contact detection unit 14, and a charge control unit 15.

The measurement unit 13 is a processor configured to measure the signal strength (signal strength level) SL of a signal received by the floor mat 20 (intra-body communication antenna 21) (signal strength for intra-body communication). More specifically, field intensity or the like in which the charge amount stored between the user's body (herein, the sole of the body) and the intra-body communication antenna 21 is measured.

The charge control unit 15 is a processor configured to adjust the charge amount of the portable terminal 30 to adjust (increase and decrease) the signal strength SL for intra-body communication in cooperation with the charge control unit 35 of the portable terminal 30.

For example, the charge control unit 15 sends a charge amount adjustment instruction to the charge control unit 35 of the portable terminal 30 to adjust the charge amount of the portable terminal 30. The charge control unit 35 of the portable terminal 30 adjusts (increases) voltage for charging to adjust (increase) the charge amount of the portable terminal 30 in response to the charge amount adjustment instruction (such as an instruction to increase the charge amount (also referred to as an increase command)). More specifically, when the value of the signal strength SL measured by the measurement unit 13 is smaller than a predetermined threshold TH1, the charge control unit 15 increases the voltage for controlling the charge amount to increase the signal strength (signal strength level) SL for intra-body communication according to the difference between the threshold TH1 and the measured value.

The contact detection unit 14 detects the user's touch operation on the touch panel 25 in cooperation with the input/output control unit 11. As will be described in detail later, the charge control unit 15 performs the charge amount adjustment control (in other words, signal strength adjustment control) after the user's touch operation on the touch panel 25 is started.

<1-2. Operation>
<Principle of Intra-Body Communication>

Figure 3:
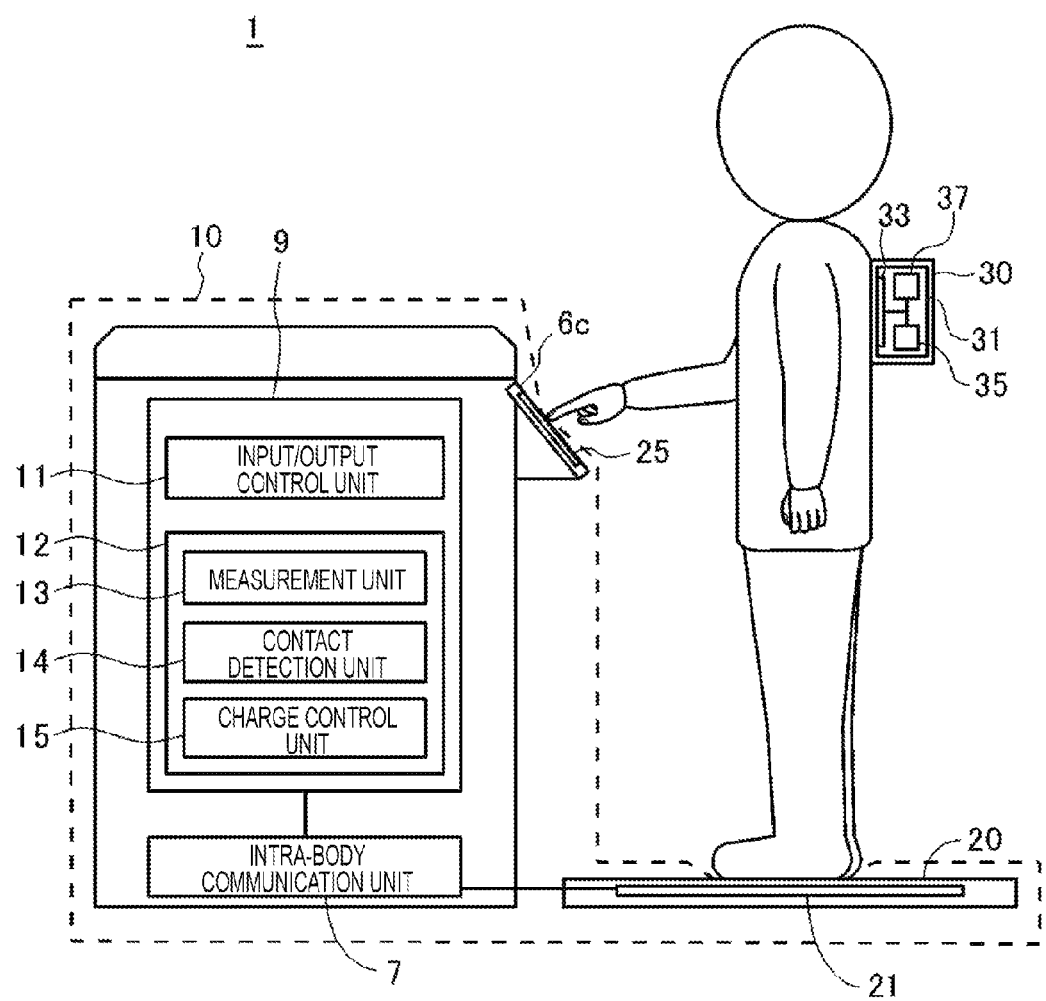
FIG. 3 is a conceptual diagram showing a state in which data communication is carried out between the MFP and a portable terminal via the body of a user.
Figure 4:
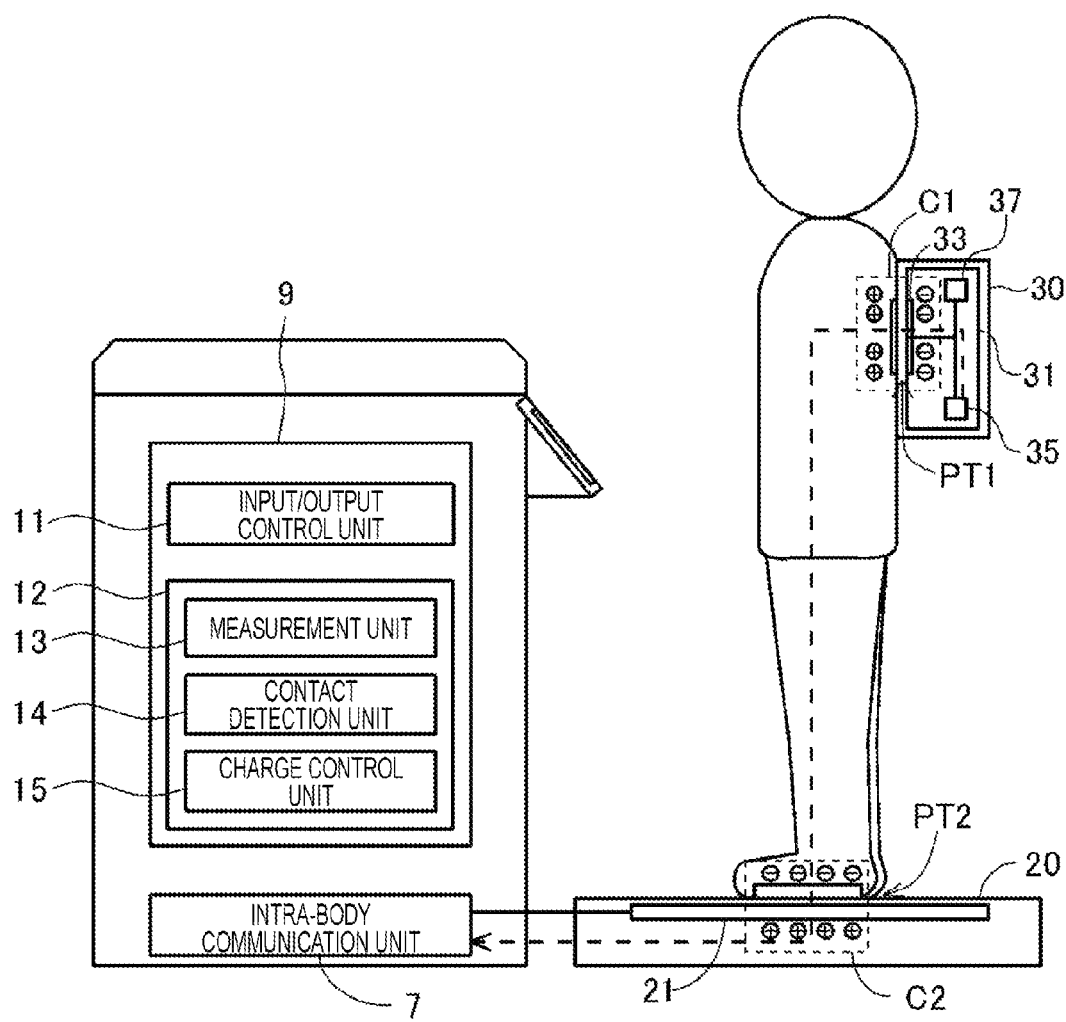
FIG. 4 is a conceptual diagram showing a state in which data communication is carried out between the MFP and the portable terminal via the body of the user.

FIGS. 3 and 4 are conceptual diagrams showing states in which data communication is carried out between the MFP 10 and the portable terminal 30 via the user's body. In FIG. 4, a state of the charge on the body surface is shown in detail.

In particular, as shown in FIG. 4, when the portable terminal 30 is carried by the user, a virtual capacitor C1 can be assumed to be present at a position PT1 where the electrode 33 provided in the portable terminal 30 and the user's body (such as the back or the chest) are close to each other. In other words, an electrostatic field is present at the position PT1 where the electrode 33 and the user's body are close to each other.

In addition, when the user stands on the floor mat 20, a virtual capacitor C2 can be assumed to be present at a position PT2 where the user's sole and the intra-body communication antenna (electrode) 21 are close to each other. In other words, an electrostatic field is present at the position PT2 where the intra-body communication antenna 21 and the user's body are close to each other.

The charge control unit 35 of the portable terminal 30 controls the amount of charge (charge amount) so that an amount of charge according to an output signal representing data is induced on the electrode 33. As a result, the charge amount at the capacitor C1 (proximity position PT1) changes with the data (output signal), and the amount of charge induced on the body surface also changes according to such control. Furthermore, the data (output signal) can be recognized by detecting a change in the charge amount at the capacitor C2 (proximity position PT2) between the sole of the body and the intra-body communication antenna 21.

As described above, the communication system 1 can carry out data communication (intra-body communication) by using the electrostatic fields at the positions PT1 and PT2. More specifically, the intra-body communication unit 37 of the portable terminal 30 and the intra-body communication unit 7 of the MFP 10 can carry out data communication (intra-body communication) by using the electrostatic fields at the electrode 33 and the intra-body communication antenna 21.

<Control Principle>

With such an intra-body communication technology, data communication is carried out by using the charge stored in the human body, and is thus susceptible to noise. In particular, when the signal strength (signal strength level) SL becomes lower than a certain value (such as the predetermined threshold TH1), data communication becomes particularly susceptible to noise and it becomes difficult to carry out normal data communication.

Thus, in the present embodiment, when the signal strength SL is smaller than the predetermined threshold TH1, the charge amount of the capacitor C1 is increased to increase the signal strength (signal strength level) SL.

Specifically, in a state in which the user is on the floor mat 20, the measurement unit 13 always measures the signal strength SL (herein, the field intensity (V/m) in the capacitor C2) of a communication signal (received signal) received by the intra-body communication unit 7 via the intra-body communication antenna 21.

If the measured value of the signal strength SL is smaller than the predetermined threshold TH1, the charge control unit 15 increases the charging voltage for supplying a charge (charging voltage for controlling the charge amount) by the charge control unit 35 according to the difference between the threshold TH1 and the measured value to increase the signal strength SL for intra-body communication. More specifically, the charge control unit 15 changes the charging voltage for controlling the charge amount by the charge control unit 35 from a previous supply voltage value (reference value) to a corrected value to increase the signal strength SL for intra-body communication. Note that the corrected value is a value obtained by adding a value (incremental value) resulting from multiplying a difference Δ (=threshold TH1−measured value) between the threshold TH1 and the measured value of the signal strength SL by a predetermined coefficient to the previous supply voltage value, for example. As a result of such correction control, the charge control units 15 and 35 increase the signal strength SL of a signal for intra-body communication received by the intra-body communication antenna 21 toward the threshold TH1 (for example, using the threshold TH1 as a target value). As a result, the signal strength SL is controlled so as not to be smaller than the threshold TH1 wherever possible. It is therefore possible to realize relatively stable communication operation.

If such control (signal strength adjustment control) for increasing the signal strength SL as described above is always performed, the charging voltage is increased relatively frequently, which causes a problem that the battery of the portable terminal 30 is consumed relatively rapidly.

For such a problem, the present inventors have worked out a solution of performing signal strength adjustment control (control to increase the signal strength) under the condition that the user's touch operation on the touch panel 25 is started.

This will be described below.

Figure 5:
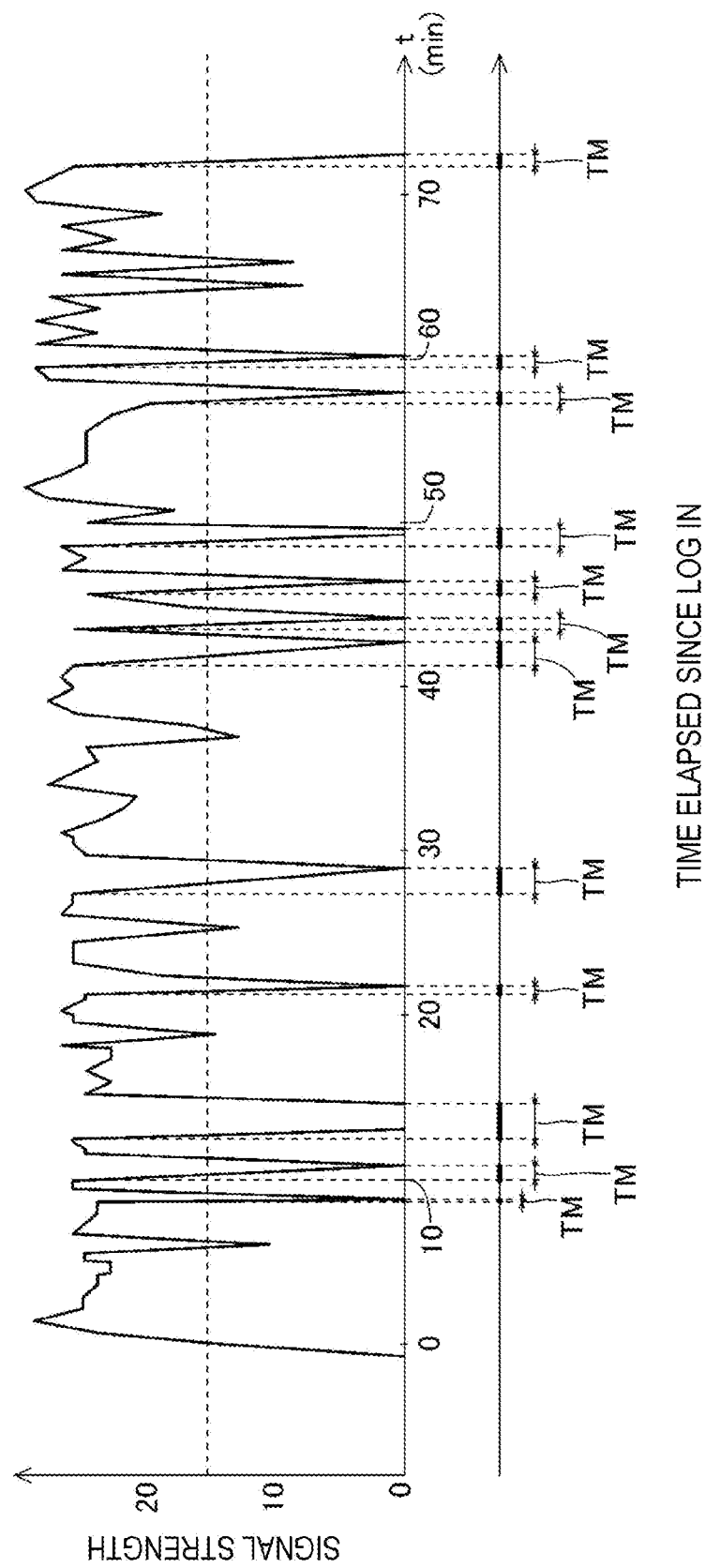
FIG. 5 is a graph showing a result of measuring signal strength at an antenna for intra-body communication.

FIG. 5 is a graph showing a result of measuring the signal strength SL at the intra-body communication antenna 21. As shown in FIG. 5, the inventors have found out that the signal strength SL particularly lowers when a user's finger comes in contact with the touch panel 25 (see FIG. 3). With reference to FIG. 5, it can be seen that the signal strength SL particularly lowers during each touch period TM shown by a thick line.

This is considered to be a phenomenon that "when a user's finger touches the touch panel 25, the charge on the surface of the user's body flows to the touch panel 25, and the amount of charge on the body surface decreases, resulting in that the signal strength SL of a received signal (a signal received by the intra-body communication antenna 21) at the position PT2 is decreased."

The inventors have therefore focused, in particular, on the decrease in the signal strength SL when the user's finger touches the touch panel 25, and propose performing signal strength adjustment control (correction control) to increase the signal strength SL under the condition that the user's touch operation on the touch panel 25 is started.

As a result of limiting the timing for performing correction control in this manner, power consumption can be reduced as compared to the case where the correction control (signal strength adjustment control) is always performed. Thus, the battery consumption can also be reduced.

<Control Operation>

Figure 7:
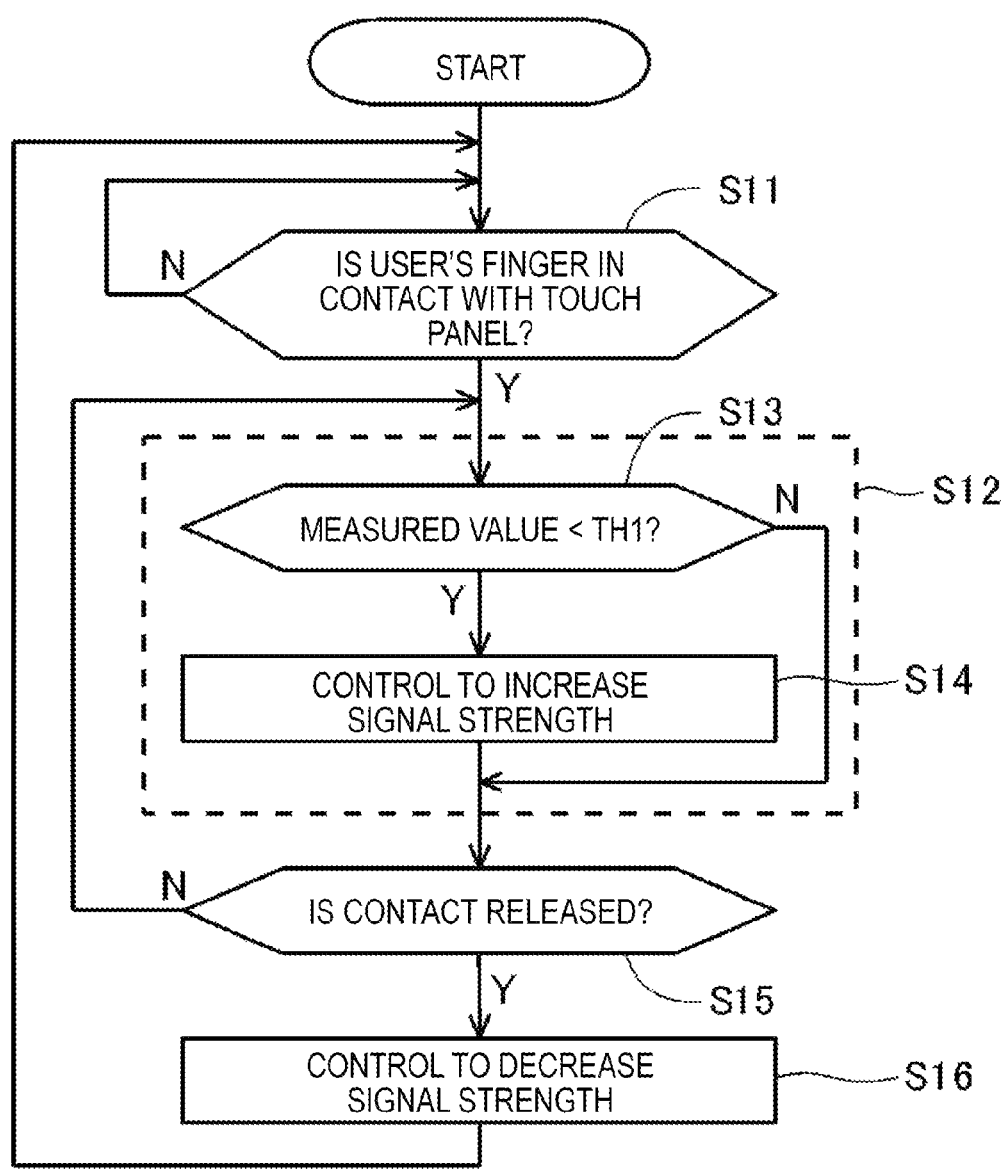
FIG. 7 is a flowchart showing operation of the MFP.

Next, operation of the MFP 10 according to the first embodiment will be described with reference to FIG. 7. FIG. 7 is a flowchart showing the operation of the MFP 10. In the following, description will be made on a mode in which the signal strength adjustment control (correction control) to increase the signal strength SL is performed under the condition that the user's touch operation on the touch panel 25 is started and the touch operation is not terminated (the touch operation is ongoing).

Herein, it is assumed that the user is on the floor mat 20 and intra-body communication operation between the portable terminal 30 and the MFP 10 is already started and carried out. It is also assumed that operation of measuring the signal strength SL at the intra-body communication antenna 21 is already started and carried out by the measurement unit 13 or the like.

In such a state, as shown in FIG. 7, it is first determined in step S11 whether or not a user's finger is in contact with the touch panel 25. If it is determined that the user's finger is not in contact with the touch panel 25, the operation does not proceed to step S12 and subsequent steps but moves to a standby state. If it is determined that the user's finger is in contact with the touch panel 25, the operation proceeds to step S12.

In step S12, the signal strength adjustment control (control to increase the signal strength SL) described above or the like is performed.

Specifically, it is determined in step S13 whether or not a measured value of the signal strength SL of a received signal at the intra-body communication antenna 21 is smaller than the predetermined threshold TH1.

Herein, the threshold TH1 may be determined in advance on the basis of experiments or the like to be a value corresponding to the signal strength level that allows successful intra-body communication (a value larger than a (insufficient) signal strength that causes communication failure by a predetermined degree).

If the measured value of the signal strength SL is equal to or larger than the predetermined threshold TH1, the operation proceeds to step S15 without performing the process of step S14. If the measured value of the signal strength SL is smaller than the predetermined threshold TH1, the operation proceeds to step S14.

In step S14, the signal strength adjustment control (control to increase the signal strength SL) described above is performed. Specifically, the charging voltage for supplying a charge (charging voltage for controlling the charge amount) by the charge control unit 35 is increased according to the difference between the threshold TH1 and the measured value of the signal strength SL. Specifically, the charge control unit 15 of the MFP 10 transmits an instruction to increase the charge amount (specifically, an instruction to increase the charging voltage) to the charge control unit 35 through an intra-body communication path. The increase instruction can contain an instruction to increase the charging voltage and the amount to be increased. The amount to be increased is determined according to the difference between the threshold TH1 and the measured value. The increase instruction is transmitted before the signal strength is significantly lowered, so as to be successfully received by the charge control unit 35. Note that the threshold TH1 is determined to be a value a little larger than the lowest level at which communication is possible, and the increase instruction can be successfully transmitted/received even if the signal strength is a little lower than the threshold TH1.

Upon receiving the increase instruction from the charge control unit 15, the charge control unit 35 increases the charging voltage for supplying a charge (charging voltage for controlling the charge amount) of the communication unit 31 (steps S21 and S22 (FIG. 8)). The signal strength (signal strength level) SL for intra-body communication is increased accordingly.

In step S15, it is determined whether or not the touch state (contact state) of the user's finger on the touch panel 25 is released.

If it is determined that the touch state is not yet released (in other words, the touch operation is ongoing), the operation of step S12 is repeated.

If it is determined that the touch state is released (in other words, the touch operation is terminated), the control operation in step S12 is stopped and the operation proceeds to step S16. In other words, when the user's touch operation on the touch panel is terminated, the signal strength adjustment control (control to increase the signal strength) in step S12 is not performed.

In step S16, control to decrease the signal strength is performed. Specifically, the charge control unit 15 of the MFP 10 transmits an instruction to decrease the charge amount (specifically, an instruction to decrease the charging voltage) to the charge control unit 35. The decrease instruction (also referred to as a decrease command) contains an instruction to decrease the charging voltage to a predetermined reference value. Upon receiving the decrease instruction from the charge control unit 15, the charge control unit 35 decreases the charging voltage for supplying a charge (charging voltage for controlling the charge amount) of the communication unit 31 (steps S23 and S24 (FIG. 8)). As a result, the signal strength (signal strength level) SL for intra-body communication is prevented from being increased excessively.

Thereafter, the operation moves to the standby state in step S11 again.

Figure 8:
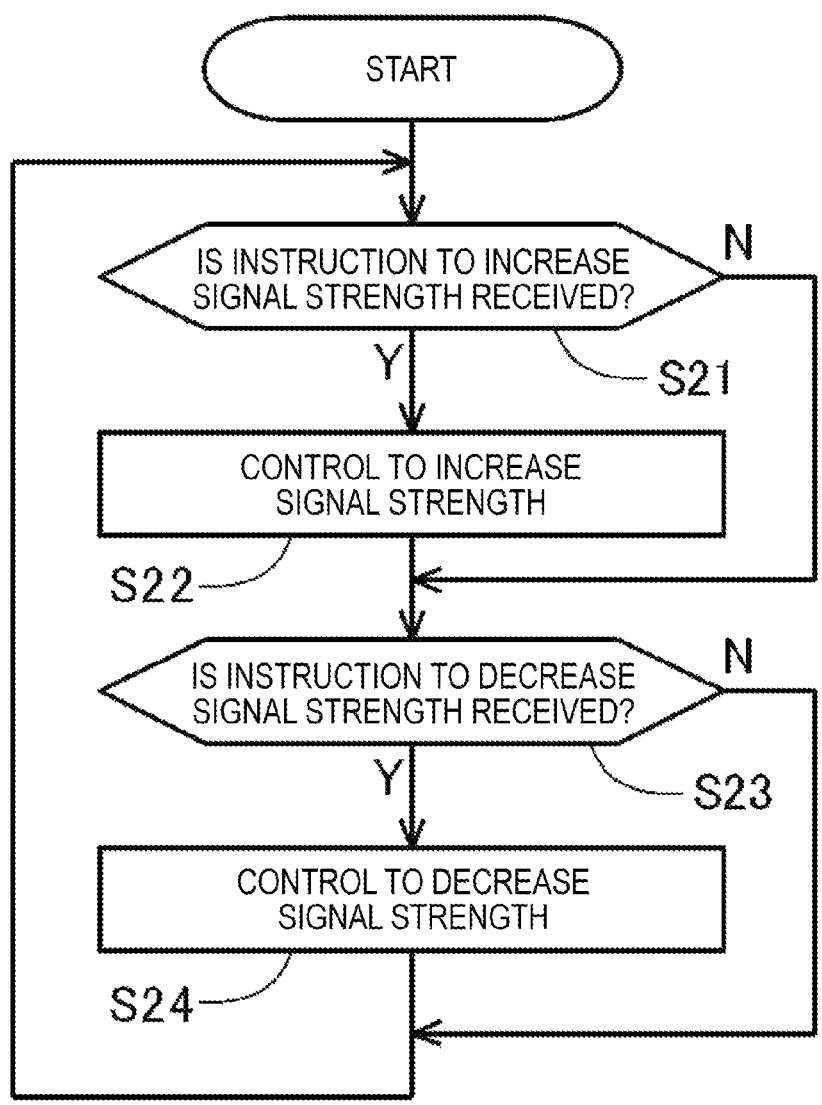
FIG. 8 is a flowchart showing operation of the portable terminal.

Next, operation of the portable terminal 30 (charge control unit 35) will be described with reference to FIG. 8. FIG. 8 is a flowchart showing the operation of the portable terminal 30 (charge control unit 35).

As shown in FIG. 8, in step S21, it is determined whether or not an increase instruction from the charge control unit 15 is received. If the increase instruction is not yet received, the operation proceeds to step S23. If the increase instruction is received, the operation proceeds to step S22. In step S22, the charge control unit 35 increases the charging voltage for supplying a charge (charging voltage for controlling the charge amount) of the communication unit 31 on the basis of the increase instruction as described above. The signal strength SL for intra-body communication is increased accordingly.

Furthermore, in step S23 after step S22, it is determined whether or not a decrease instruction from the charge control unit 15 is received. If the decrease instruction is not yet received, the operation returns to step S21. If the decrease instruction is received, the operation proceeds to step S24. In step S24, the charge control unit 35 decreases the charging voltage for supplying a charge (charging voltage for controlling the charge amount) of the communication unit 31 on the basis of the decrease instruction as described above. As a result, the signal strength SL for intra-body communication is prevented from being increased excessively.

Thereafter, the operation returns to step S21.

According to the operation as described above, the charge amount of the capacitor C1 is increased when the signal strength (signal strength at the capacitor C2) SL of the received signal at the intra-body communication antenna 21 is lower than the predetermined threshold TH1. This increases the charge amount of the capacitor C2, and increases the signal strength SL. As a result, it is possible to reduce communication errors and improve communication efficiency, so that the communication operation is stabilized.

Furthermore, the signal strength adjustment control (control to increase the signal strength SL) is performed under the condition that the user's touch operation on the touch panel 25 is started. More specifically, the signal strength adjustment control can be performed only during a touch period TM. In other words, the signal strength adjustment control is not performed during periods other than the periods of user's touch operation on the touch panel 25 (before starting and after termination of touch operation). As a result of performing control in which the timing for correction is limited in this manner, power consumption can be reduced as compared to the case where the signal strength adjustment control (control to increase the signal strength SL) is always performed. Thus, the battery consumption can also be reduced.

Figure 6:
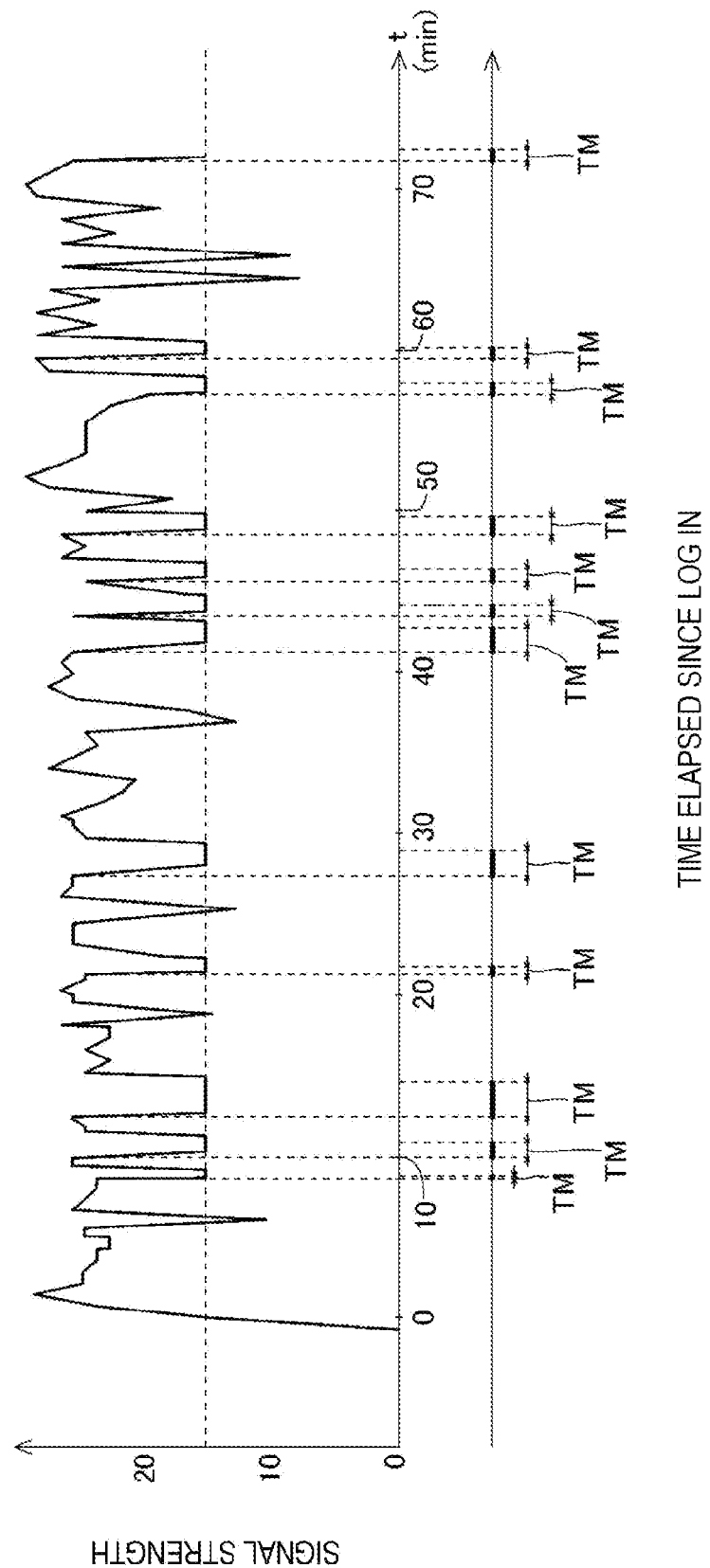
FIG. 6 is a conceptual graph showing a result of adjusting the signal strength.

FIG. 6 is a conceptual graph showing a result of adjusting the signal strength SL according to such correction control.

As shown in FIG. 6, for example, when the signal strength of a received signal at the intra-body communication antenna 21 is lower than the predetermined threshold TH1 during a user's touch period TM, the signal strength adjustment control is performed and the signal strength SL is increased. As a result, a signal strength higher than the threshold TH1 is maintained, a good SNR is ensured, allowing stable communication during the period. Thus, communication can be stabilized.

Note that the signal strength SL may be temporarily lowered during periods other than user's touch periods TM. During periods other than user's touch periods TM, however, the degree to which the signal strength SL is lowered is relatively small, and even if the signal strength SL is significantly lowered, the frequency at which the signal strength SL is significantly lowered is relatively low. To put it simply, the probability that the signal strength SL is significantly lowered is relatively low. In view of such circumstances, the signal strength adjustment control (control to increase the signal strength SL) is not performed during periods other than the user's touch periods TM.

In contrast, during the user's touch periods TM, significant lowering of the signal strength SL occurs frequently. During such touch periods, the signal strength adjustment control (control to increase the signal strength SL) is performed. As a result, communication can be efficiently stabilized.

As described above, according to the embodiment, communication can be stabilized while reducing power consumption. In particular, as a result of reducing power consumption of the portable terminal 30 driven by a battery, it is possible to prevent the battery life of the portable terminal 30 from being shortened.

2. Second Embodiment

A second embodiment is a modified example of the first embodiment. In the following, differences from the first embodiment will be mainly described.

In the first embodiment, the mode in which communication between the MFP 10 and the portable terminal 30 is carried out via a human body is described.

Figure 9:
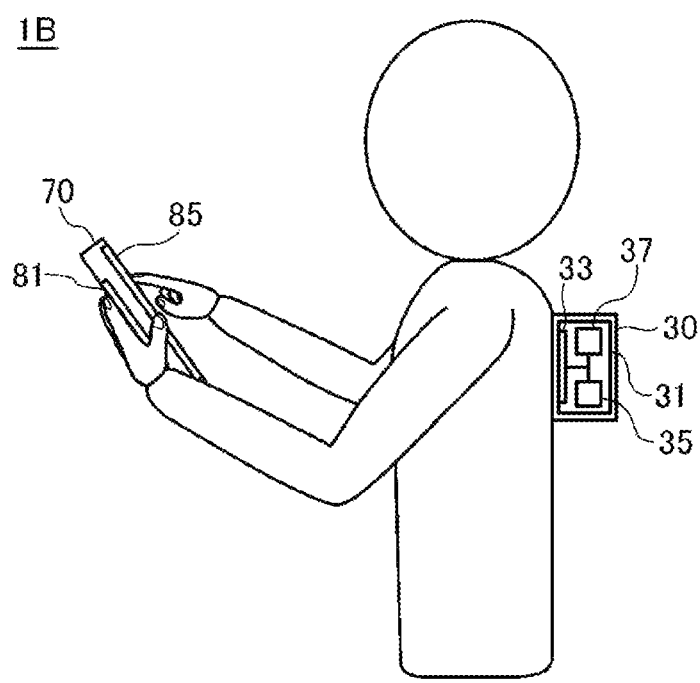
FIG. 9 is a schematic diagram showing a communication system according to a second embodiment.

In contrast, in the second embodiment, a mode in which communication between a personal digital assistant 70 and the portable terminal 30 is carried out via a human body as shown in FIG. 9 will be described. FIG. 9 is a schematic diagram showing a communication system 1 (1B) according to the second embodiment. The communication system 1B includes the personal digital assistant 70 and the portable terminal 30.

Furthermore, the second embodiment is different from the first embodiment in that an intra-body communication antenna 81 embedded in the back (rear face) of the personal digital assistant 70 instead of the intra-body communication antenna 21 under the floor mat.

Figure 10:
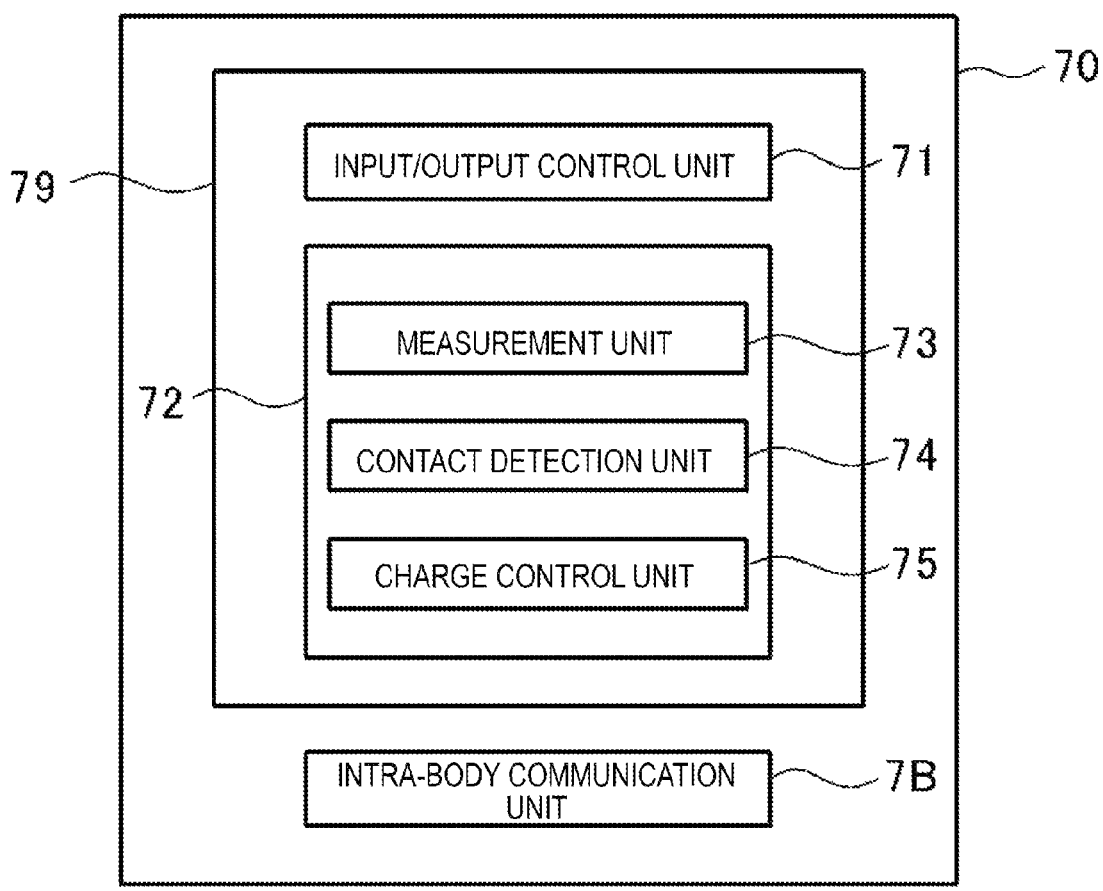
FIG. 10 is a diagram showing functional blocks of a personal digital assistant.

Examples of the personal digital assistant 70 include a smart phone and a tablet terminal. The personal digital assistant 70 includes a controller 79 and realizes various processors including an input/output control unit 71 and an intra-body communication control unit 72 by executing predetermined programs by the controller 79 (see FIG. 10). The input/output control unit 71 and the intra-body communication control unit 72 in the second embodiment are processors similar to the input/output control unit 11 and the intra-body communication control unit 12, respectively, of the MFP 10 in the first embodiment. The personal digital assistant 70 also includes an intra-body communication unit 7 (also represented by 7B) similarly to the first embodiment. FIG. 10 is a diagram showing functional blocks of the personal digital assistant.

Figure 11:
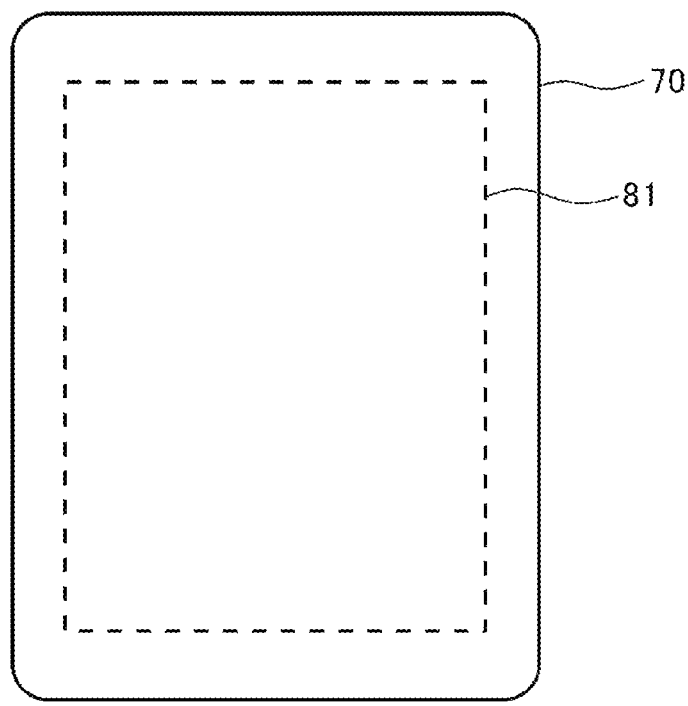
FIG. 11 is a rear view of the personal digital assistant.

The personal digital assistant 70 having a substantially plate shape includes a touch panel 85 over substantially the entire area of the front surface (front side) having a substantially rectangular shape excluding the edge thereof, and the intra-body communication antenna 81 over substantially the entire area of the rear surface (back side) having a substantially rectangular shape. The touch panel 85 has a configuration similar to that of the touch panel 25. The intra-body communication antenna 81 (see FIG. 11) has a configuration similar to that of the intra-body communication antenna 21, but is different from the intra-body communication antenna 21 in that the intra-body communication antenna 81 is embedded in the back of the personal digital assistant 70. FIG. 11 is a rear view of the personal digital assistant.

With such a configuration, intra-body communication can also be carried out between the portable terminal 30 and the personal digital assistant 70 similarly to the first embodiment. More specifically, when the user holds the personal digital assistant 70 by placing one hand (left hand, for example) over the back of the personal digital assistant 70 and performs operation on the touch panel 85 with the other hand (right hand, for example), the control operation (signal strength adjustment control, etc.) similar to that in the first embodiment is performed.

According to such operation, effects similar to those of the first embodiment can be produced.

3. Modified Examples

While the embodiments of the present invention have been described above, the invention is not limited to those described above.

For example, although the mode in which the intra-body communication antenna 21 is located in the back of the personal digital assistant 70 is described in the second embodiment, the present invention is not limited thereto, and the intra-body communication antenna may be located in a side face of the personal digital assistant 70. In this manner, the intra-body communication antenna can be provided in a face (rear face or side face) of the personal digital assistant 70 other than the face on which the touch panel 85 is located.

Furthermore, although the modes in which the intra-body communication antennas 21 and 81 are provided separately from the touch panels 25 and 85, respectively, are described in the embodiments, the intra-body communication antenna is not limited thereto. For example, the intra-body communication antenna may be built in the touch panel 25 (or the touch panel 85). Then, intra-body communication between a device (the MFP 10, the personal digital assistant 70, or the like) in which the intra-body communication antenna is built and the portable terminal 30 may be carried out by using the intra-body communication antenna built in the touch panel.

In this case, the intra-body communication may be carried out via a finger in contact with the touch panel (for example, the index finger of the right hand touching the touch panel) for touch operation. Alternatively, a finger (for example, the thumb of the left hand) other than the finger in contact with the touch panel (for example, the index finger of the right hand touching the touch panel) for touch operation may also be brought in contact with the touch panel, and intra-body communication may be carried out by using the finger (for example, the thumb of the left hand).

Furthermore, the mode in which the voltage for controlling the charge amount (and also the signal strength SL for intra-body communication) is increased according to a difference (=threshold TH1−measured value) between the measured value of the signal strength SL and the predetermined threshold TH1 is described in the embodiments. The present invention, however, is not limited thereto. Specifically, it is sufficient that the voltage for controlling the charge amount (and also the signal strength SL for intra-body communication) is increased according to the difference between the threshold TH1 and the measured value, and the voltage for controlling the charge amount (and also the signal strength SL for intra-body communication) may be increased according to a ratio of the measured value to the threshold TH1, for example.

Furthermore, the mode in which the signal strength adjustment control (control to increase the signal strength SL) can be performed under the condition that the user's touch operation on the touch panel (25, 85) is started and the touch operation is not terminated is described in the embodiments. To put it simply, the control to increase the signal strength can be performed only during a touch period. The present invention, however, is not limited thereto.

For example, the signal strength adjustment control (control to increase the signal strength SL) may be performed for a predetermined period (ten seconds, for example) after touch operation is started. In other words, signal strength adjustment control based on comparison between the measured value of the signal strength and the threshold TH1 may be started in response to start of touch operation, and the signal strength adjustment control may be stopped after the signal strength adjustment control is continued for a predetermined period (that is, after a lapse of the predetermined period). Thereafter, the signal strength adjustment control based on comparison between the measured value of the signal strength SL and the threshold TH1 may be performed again in response to start of touch operation again.

Alternatively, when the signal strength SL is lower than the threshold TH1 when the touch state is released after the control to increase the signal strength SL is started in response to start of touch operation, the control to increase the signal strength SL may be continued until the signal strength SL is recovered to be equal to or higher than the threshold (instead of immediately terminating the signal strength increasing control in response to termination of the touch operation).

Furthermore, although the modes in which the idea of the present invention is applied to the operation of transmission from the portable terminal 30 to the MFP 10 (or the personal digital assistant 70) are mainly described in the embodiments, the idea of the present invention may be reversely applied to operation of transmission from the MFP 10 (or the personal digital assistant 70) to the portable terminal 30.

More specifically, when the measured value of the signal strength of a signal received by the electrode 33 of the portable terminal 30 is smaller than a predetermined threshold, signal strength increasing control to increase the signal strength may be performed by the charge control unit 35, 15, or the like.

In this case, a measurement unit configured to measure the signal strength of a signal received by the communication unit 31 (intra-body communication unit 37) via the electrode 33 and an acquisition unit configured to acquire information on the user's operation on the touch panel (25, 85) ("touch state", "non-touch state", etc.) from the MFP 10 (or the personal digital assistant 70) through intra-body communication may further be provided in the portable terminal 30 (communication unit 31). Furthermore, an intra-body communication control unit similar to the intra-body communication control unit 12 may be provided in the portable terminal 30 (communication unit 31). These processors may be realized by executing predetermined programs similar to the programs described above by a computer included in the portable terminal 30. As a result of executing the predetermined programs, operation similar to that in FIG. 7 may be performed at the portable terminal 30 and operation similar to that in FIG. 8 may be performed at the MFP 10 (or the personal digital assistant 70). For example, in operation of transmission from the MFP 10 (personal digital assistant 70) to the portable terminal 30, signal strength increasing control to increase the signal strength of a received signal at the communication unit 31 (intra-body communication unit 37) may be performed when the measured value of the signal strength is smaller than a predetermined threshold under the condition that the user's touch operation on the touch panel (25, 85) of the MFP 10 is started. More specifically, the intra-body communication unit 37 and the charge control unit 35 may transmit an increase instruction to the charge control unit (15, 75) and the charge control unit (15, 75) may increase the voltage for controlling the charge amount to increase the charge on the surface of the user's body via the intra-body communication antenna (21, 81). Any method similar to the control methods in the embodiment may be used as the control method.

According to such a mode, communication can also be stabilized while reducing power consumption. In particular, application of the above-described idea to operation of transmission from the personal digital assistant 70 driven by a battery to the portable terminal 30 can reduce power consumption of the personal digital assistant 70 and prevent the battery life of the personal digital assistant 70 from being shortened.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A communication system comprising:
 a first communication device carried by a user; and
 a second communication device that carries out data communication with the first communication device via the user's body, wherein
 the first communication device includes:
  a first intra-body communication unit configured to carry out data communication with the second communication device via the body, and
  a charge control unit configured to control an amount of charge on a surface of the body,
 the second communication device includes:
  a capacitive touch panel,
  an intra-body communication antenna placed to be close enough to the body to create capacitance between the intra-body communication antenna and the body sufficient to enable communication,
  a second intra-body communication unit configured to carry out data communication with the first communication device via the body by using an electrostatic field at a first position where the first communication device and the body are close enough to each other to create capacitance between the first communication device and the body sufficient to enable communication, and an electrostatic field at a second position where the body and the intra-body communication antenna are close enough to each other to create capacitance between the body and the intra-body communication antenna sufficient to enable communication, and
  an intra-body communication control unit configured to perform signal strength increasing control to increase signal strength of a signal being received at the second intra-body communication unit when a measured value of the signal strength is lower than a predetermined threshold under a condition that user's touch operation on the touch panel is started, after start of receiving of the signal utilizing the intra-body communication antenna, and
  the signal strength increasing control is control for increasing voltage for controlling a charge amount of the charge control unit of the first communication device according to a difference between the predetermined threshold and the measured value to increase the signal strength of the signal being received at the second intra-body communication unit.

2. The communication system according to claim 1, wherein the intra-body communication control unit transmits an increase instruction to increase voltage for controlling the charge amount of the charge control unit to the first intra-body communication unit to increase the voltage for controlling the charge amount of the charge control unit.

3. The communication system according to claim 1, wherein when the user's touch operation on the touch panel is terminated, the intra-body communication control unit performs no signal strength increasing control.

4. The communication system according to claim 1, wherein the intra-body communication antenna is provided at a floor mat connected to a body of the second communication device.

5. The communication system according to claim 1, wherein
 the second communication device is a personal digital assistant, and
 the intra-body communication antenna is provided on a face of the personal digital assistant other than a face on which the touch panel is placed.

6. The communication system according to claim 1, wherein the intra-body communication antenna is built in the touch panel.

7. The communication system according to claim 1, wherein the first intra-body communication unit is driven by a battery in the first communication device.

8. A communication device capable of carrying out intra-body communication with a communication unit, the communication device comprising:
 a capacitive touch panel;
 an intra-body communication antenna placed to be close enough to a user's body to create capacitance between the intra-body communication antenna and the body sufficient to enable communication;
 an intra-body communication unit configured to carry out data communication with the communication unit via the body by using an electrostatic field at a first position where the communication unit and the body are close enough to each other to create capacitance between the communication device and the body sufficient to enable communication, and an electrostatic field at a second position where the body and the intra-body communication antenna are close enough to each other to create capacitance between the body and the intra-body communication antenna sufficient to enable communication; and an intra-body communication control unit configured to perform signal strength increasing control to increase signal strength of a signal being received at the intra-body communication unit when a measured value of the signal strength is lower than a predetermined threshold under a condition that user's touch operation on the touch panel is started, after start of receiving of the signal utilizing the intra-body communication antenna, wherein the signal strength increasing control is control for increasing voltage for controlling a charge amount of a charge control unit of the communication unit according to a difference between the predetermined threshold and the measured value to increase the signal strength.

9. The communication device according to claim 8, wherein the intra-body communication control unit transmits an increase instruction to increase voltage for controlling the charge amount of the charge control unit of the communication unit to the communication unit to increase the voltage for controlling the charge amount.

10. The communication device according to claim 8, wherein when the user's touch operation on the touch panel is terminated, the intra-body communication control unit performs no signal strength increasing control.

11. The communication device according to claim 8, wherein the communication device is an image forming apparatus.

12. A non-transitory recording medium storing a computer readable program, the program causing a computer served as a communication device to execute the processing comprising the steps of:

a) carrying out data communication with a communication unit via a user's body by using an electrostatic field at a contact position between the body and an intra-body communication antenna placed to be close enough to the body to create capacitance between the intra-body communication antenna and the body sufficient to enable communication; and b) performing signal strength increasing control to increase signal strength of a signal being received by the intra-body communication antenna when a measured value of the signal strength is smaller than a predetermined threshold under a condition that user's touch operation on a capacitive touch panel provided on the communication device is started, after start of receiving of the signal utilizing the intra-body communication antenna, wherein the signal strength increasing control is control for increasing voltage for controlling a charge amount of a charge control unit of the communication unit according to a difference between the predetermined threshold and the measured value to increase the signal strength.

13. A communication system comprising:

a first communication device carried by a user; and a second communication device that carries out data communication with the first communication device via the user's body, wherein the second communication device includes:

a capacitive touch panel, an intra-body communication antenna placed to be close enough to the body to create capacitance between the intra-body communication antenna and the body sufficient to enable communication, and a charge control unit configured to control an amount of charge on a surface of the body, the first communication device includes:

a first intra-body communication unit configured to carry out data communication with the second communication device via the body by using an electrostatic field at a first position where the second communication device and the body are close enough to each other to create capacitance between the second communication device and the body sufficient to enable communication, and an electrostatic field at a second position where the intra-body communication antenna and the body are close enough to each other to create capacitance between the intra-body communication antenna and the body sufficient to enable communication, an acquisition unit configured to acquire information on user's touch operation on the touch panel, and an intra-body communication control unit configured to perform signal strength increasing control to increase signal strength of a signal being received at the first intra-body communication unit when a measured value of the signal strength is lower than a predetermined threshold under a condition that user's touch operation on the touch panel is started, after start of sending of the signal utilizing the intra-body communication antenna, and the signal strength increasing control is control for increasing voltage for controlling a charge amount of the charge control unit according to a difference between the predetermined threshold and the measured value to increase the signal strength.

14. The communication system according to claim 13, wherein the intra-body communication control unit transmits an increase instruction to increase voltage for controlling the charge amount of the charge control unit to a second intra-body communication unit provided in the second communication device to increase the voltage for controlling the charge amount of the charge control unit.

15. A communication device carried by a user, comprising:

a first intra-body communication unit configured to carry out data communication with a communication counterpart device via the user's body by using an electrostatic field at a first position where the communication counterpart device and the user's body are close enough to each other to create capacitance between the communication counterpart device and the body sufficient to enable communication, and an electrostatic field at a second position where the body and an intra-body communication antenna provided at the communication counterpart device are close enough to each other to create capacitance between the body and the intra-body communication antenna sufficient to enable communication;

an acquisition unit configured to acquire information on user's touch operation on a capacitive touch panel provided on the communication counterpart device, and an intra-body communication control unit configured to perform signal strength increasing control to increase signal strength of a signal being received at the first intra-body communication unit when a measured value of the signal strength is lower than a predetermined threshold under a condition that user's touch operation on the touch panel is started, after start of sending of the signal utilizing the intra-body communication antenna, wherein the signal strength increasing control is control for increasing voltage for controlling a charge amount of a charge control unit provided in the communication counterpart device according to a difference between the predetermined threshold and the measured value to increase the signal strength.

16. A non-transitory recording medium storing a computer readable program, the program causing a computer served as a communication device carried by a user to execute the processing comprising the steps of:
   a) carrying out data communication with a communication counterpart device via the user's body by using an electrostatic field at a first position where the communication counterpart device and the body are close enough to each other to create capacitance between the communication counterpart device and the body sufficient to enable communication, and an electrostatic field at a second position where the body and an intra-body communication antenna provided at the communication counterpart device are close enough to each other to create capacitance between the body and the intra-body communication antenna sufficient to enable communication;
   b) acquiring information on user's touch operation on a capacitive touch panel provided on the communication counterpart device, and
   c) performing signal strength increasing control to increase signal strength of a signal being received by the communication device when a measured value of the signal strength is smaller than a predetermined threshold under a condition that user's touch operation on the touch panel is started, after start of sending of the signal utilizing the intra-body communication antenna, wherein the signal strength increasing control is control for increasing voltage for controlling a charge amount of a charge control unit provided in the communication counterpart device according to a difference between the predetermined threshold and the measured value to increase the signal strength.

* * * * *